US010534798B2

(12) United States Patent
Michel (10) Patent No.: US 10,534,798 B2
(45) Date of Patent: Jan. 14, 2020

(54) COMPUTER SYSTEM AND METHOD TO UPDATE DATA AGGREGATION CONFIGURATIONS AND CONTROL DATA AGGREGATION

(71) Applicant: ORACLE INTERNATIONAL CORPORATION, Redwood Shores, CA (US)

(72) Inventor: Brian Michel, Auckland (NZ)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 228 days.

(21) Appl. No.: 15/621,030

(22) Filed: Jun. 13, 2017

(65) Prior Publication Data

US 2018/0357296 A1 Dec. 13, 2018

(51) Int. Cl.
| | |
|---|---|
| *G06F 16/00* | (2019.01) |
| *G06F 16/28* | (2019.01) |
| *H04L 29/08* | (2006.01) |
| *G06F 16/23* | (2019.01) |
| *H04L 29/06* | (2006.01) |

(52) U.S. Cl.
CPC ............. *G06F 16/28* (2019.01); *G06F 16/23* (2019.01); *H04L 67/10* (2013.01); *G06F 16/2358* (2019.01); *H04L 67/42* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,775,120 | B2* | 7/2014 | Molettiere | A61B 5/0002 702/160 |
| 9,778,639 | B2* | 10/2017 | Boettcher | G05B 19/042 |
| 9,811,553 | B2* | 11/2017 | Hill | G06Q 50/06 |
| 2011/0227754 | A1* | 9/2011 | Hill | G06Q 50/06 340/870.01 |

(Continued)

OTHER PUBLICATIONS

Brian Michel; Oracle Utilities, Load Profiling & Settlement—Proof of Concept; 2013; pp. 1-45; Oracle.

(Continued)

*Primary Examiner* — Farhan M Syed
(74) *Attorney, Agent, or Firm* — Kraguljac Law Gruop, LLC (57) ABSTRACT

Systems, methods, and other embodiments associated with updating data aggregation configurations and controlling data aggregation are described. Illustratively, a hierarchy of nodes is generated and displayed in a graphical representation of an energy supply network. The nodes store energy consumption data, and are selectable to identify where aggregations of the energy consumption data are to be performed. A settlement point is created to define an aggregation of the energy consumption data based on at least data from a plurality of the nodes identified from the hierarchy. The created settlement includes one or more characteristics selected from the database, and an algorithm defining the aggregation to be performed. The aggregation of the energy consumption data according to the settlement point is executed and controlled, and an electronic report including the aggregated energy consumption data is generated.

20 Claims, 8 Drawing Sheets

(56) References Cited

U.S. PATENT DOCUMENTS

2016/0180220 A1\* 6/2016 Boettcher ............ G05B 19/042
700/276
2018/0080807 A1\* 3/2018 Singh ...................... G01F 9/001

OTHER PUBLICATIONS

Patent Cooperation Treaty (PCT) International Search Report and Written Opinion in co-pending PCT International Appl. No. PCT/US2018/037234 (International Filing Date of Jun. 13, 2018) dated Sep. 3, 2018 (12 pgs).

\* cited by examiner

COMPUTER SYSTEM AND METHOD TO UPDATE DATA AGGREGATION CONFIGURATIONS AND CONTROL DATA AGGREGATION

BACKGROUND

Individual energy markets define market specific rules for market participants in terms of the information that the market participants must regularly submit to the market to meet their market obligations. The market specific rules tend to be complex and change frequently. Industry market participants have used so-called "bespoke systems," which are custom software systems developed according to the exact specifications provided by the market participants. Bespoke systems, however, specifically address the market-specific requirements of the individual market participant, and reflect the market-specific rules in effect at a time when the systems are developed. Any changes in the market-specific rules and/or the network configuration for which the bespoke systems were custom developed render those bespoke systems obsolete.

Commercial Off-the-Shelf ("COTS") data management solutions are configurable by the industry market participant for the market-specific rules in effect, and established at a time when the COTS solutions are installed. Similar to bespoke systems, each change in the market-specific rules and/or network renders the COTS solutions outdated until a time-consuming custom update of the installed COTS solutions can be performed. Such custom updates are performed through manual edits of the code of the COTS solutions, thereby rendering updates labor intensive and slow to reflect changes in the market-specific rules and/or changes in the network. Accordingly, COTS solutions are prone to inaccuracies in capturing, aggregating and processing data during this period of obsolescence based on outdated market-specific rules and network configurations. Thus, such COTS solutions are not suitable for use in markets, such as energy markets, where market-specific rules change frequently.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that are configured to perform data aggregation on a data set where the data aggregation is dynamically modifiable by changing parameters of the data aggregation with input selections. In one embodiment, the system is configured to utilize settlement types, aggregation hierarchies and settlement characteristics to enable dynamic data aggregation for market settlements. Consumption data is dynamically aggregated according to market or customer-specific aggregation rules defined in user-defined aggregation hierarchies and settlement types, via pre-defined and/or user-defined data characteristics or tags applied to consumption data, measuring components, settlement/service points, or any other physical or commercial delivery point modeled within the system.

Individual energy markets define market specific rules for market participants in terms of information that the market participants must regularly submit to the market to meet market obligations. The market specific rules tend to be complex and change frequently. Furthermore, data aggregation requirements exist for utility specific (internal) data processing that are very similar (if not identical) to market-defined data processing requirements. In both cases, this solution provides a way to tag underlying data (and physical/commercial data modelling entities) with pre-defined information (generic information) and user defined information (specific information). The present solution also allows users to configure, using a generic configuration interface, multiple "aggregation hierarchies," which contain the data aggregation and processing rules that are executed to aggregate the underlying data appropriately. "Settlement types," which define which entities the data aggregation and processing rules as defined in the aggregation hierarchies should be applied to can also be configured using the generic configuration interface, along with the schedule to which the aggregation processing should be performed, and any overall processing rules that are to be applied to data aggregation and processing outputs. The generic configuration interface is considered to be "generic" in the sense that the interface objects for configuring the aggregation hierarchies are not specifically adapted to individual market participants.

In furtherance of the above, illustrative embodiments generate and display a hierarchy of nodes in a graphical representation of an energy supply network. The nodes can be dragged and dropped relative to each other within the graphical representation to enable rapid customization of the aggregation hierarchy to reflect changes in the energy supply network, regulatory changes, market changes, or any other changes that affect the aggregation of energy consumption data to satisfy market obligations, internal demands, or a combination thereof. The structure of the aggregation hierarchy established as a result of the graphical arrangement of the nodes is expressed in canonical form. The canonical form of the hierarchy uniquely identifies and defines a location of each node in the aggregation hierarchy using standardized nomenclature or terminology.

As will be described below, data aggregation to be performed on energy consumption data at one or more nodes in the aggregation hierarchy can be dynamically changed by creating and defining one or more different settlement points. A settlement point can be created for the aggregation hierarchy where the settlement point is linked to a plurality of selected nodes to define an aggregation that is to be performed for the selected nodes. Settlement points can thus be established as aggregation building blocks that can be utilized to aggregate energy consumption data at more than one node in the aggregation hierarchy. In one embodiment, such a settlement point can be graphically positioned or graphically linked to nodes within the aggregation hierarchy, through a drag and drop or another graphical input protocol such as selection of the one or more nodes, to define nodes within the aggregation hierarchy where energy consumption data to be aggregated is stored, or where aggregation of the energy consumption data is to be performed. In one embodiment, the definition/configuration of the settlement point for the aggregation hierarchy can be expressed in canonical form. As changes occur to the aggregation hierarchy, energy supply network, regulatory rules, market rules, internal data demands, or any other aspect of the present system or method, the canonical expression of each node and settlement point in the aggregation hierarchy can be updated by the present system in real time. Performing such updates in real time allows the aggregations of energy consumption data to remain current, thereby limiting the possibility of erroneous aggregations resulting from obsolescence of the aggregation hierarchy. Modifying the definition of the settlement point to revise what and how selected data is aggregated reduces or eliminates having to reprogram custom software code in order to implement changes.

Figure 1:
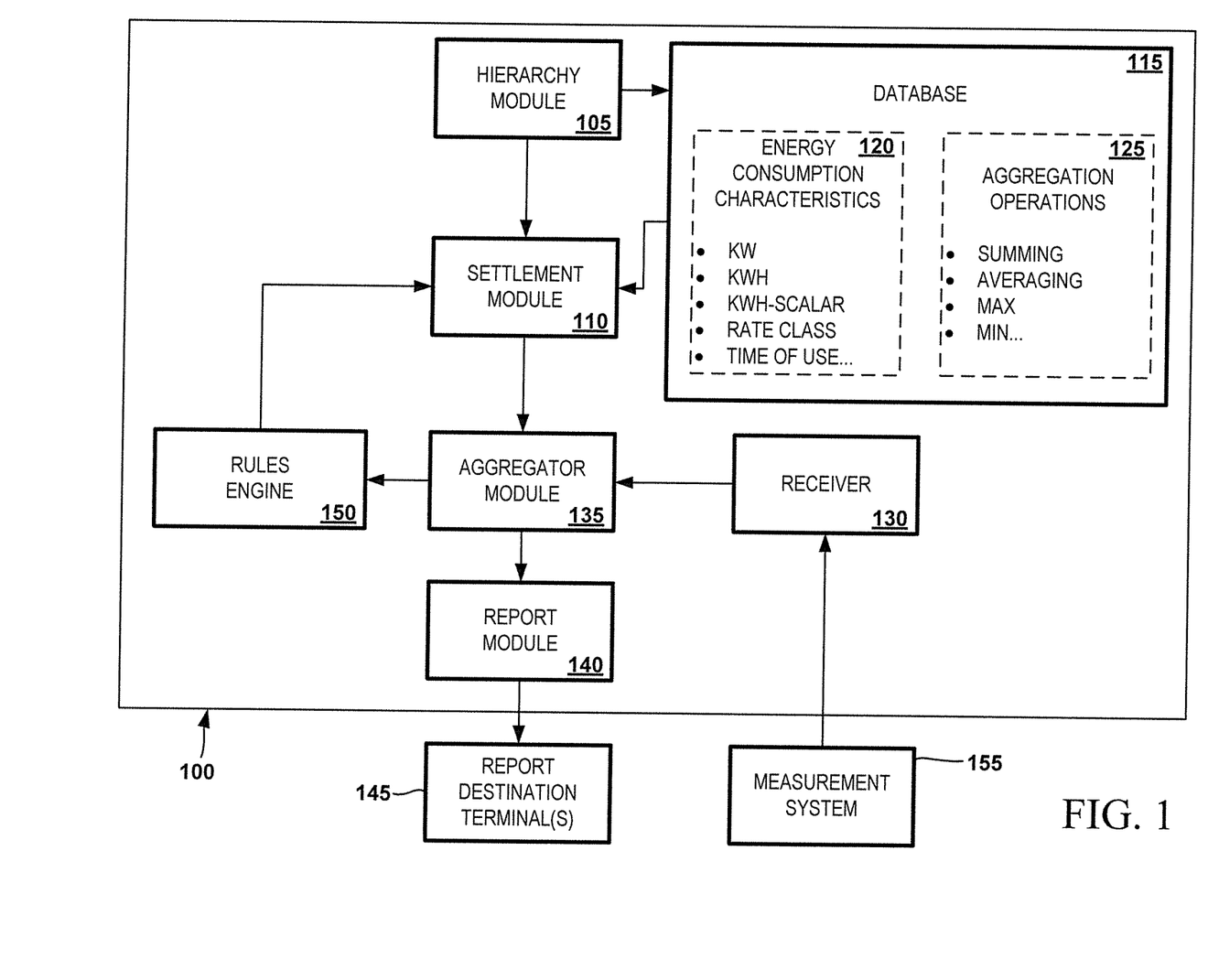
FIG. 1 schematically illustrates an embodiment of an energy distribution network represented by nodes in an aggregation hierarchy.

With reference to FIG. 1, an illustrative embodiment of a system 100 for aggregating energy consumption data within an energy supply network is shown. The present system 100 will be described in detail for aggregating consumption data for electric energy, but it is to be understood that the present system 100 is suited to aggregate consumption data for any utility such as natural gas or water, or any other consumable for which charges are based on consumption.

Figure 6:
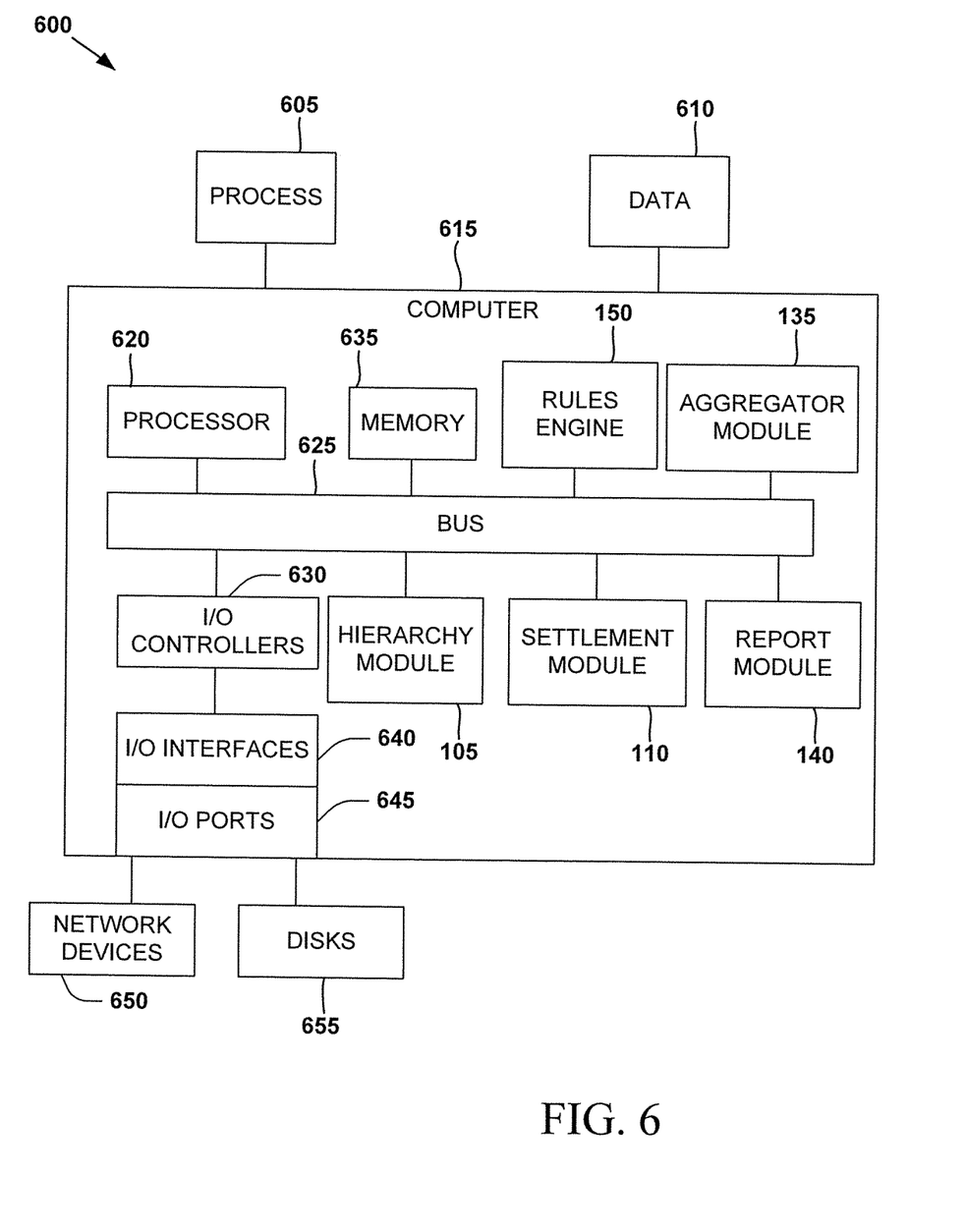
FIG. 6 is a block diagram graphically depicting a computer that can be configured to control aggregation of energy consumption data.

As illustrated, the system 100 includes a hierarchy module 105, which can be implemented as part of a computer such as a computing device 600, an embodiment of which is depicted in FIG. 6. According to other embodiments, the hierarchy module 105 or any other aspect of the system 100 described herein can be implemented as a computing/data processing system including an executable application or collection of distributed applications. The applications and computing system may be configured to operate with or be implemented as a cloud-based networking system, a software as a service (SaaS) architecture, or other type of networked computing solution. For example, the system 100 can be implemented as a centralized server-side application that provides at least the functions disclosed herein and that is accessed by many users via computing devices/terminals communicating with the computing system 100 (functioning as the server) over a computer network.

Regardless of the specific configuration adopted, the hierarchy module 105 is configured to generate and display (on a display screen 275) an aggregation hierarchy 200 (e.g., FIG. 2A) of nodes in a graphical representation of an energy supply network. The hierarchy module 105 renders the nodes in the aggregation hierarchy 200 to be selectable and movable within the aggregation hierarchy 200 relative to each other in response to receiving a manipulation command input by a user. For instance, nodes can be inserted, deleted and moved within the aggregation hierarchy 200 in response to a user selecting and moving the nodes by dragging and dropping the nodes to selected locations relative to other nodes.

Figure 2A:
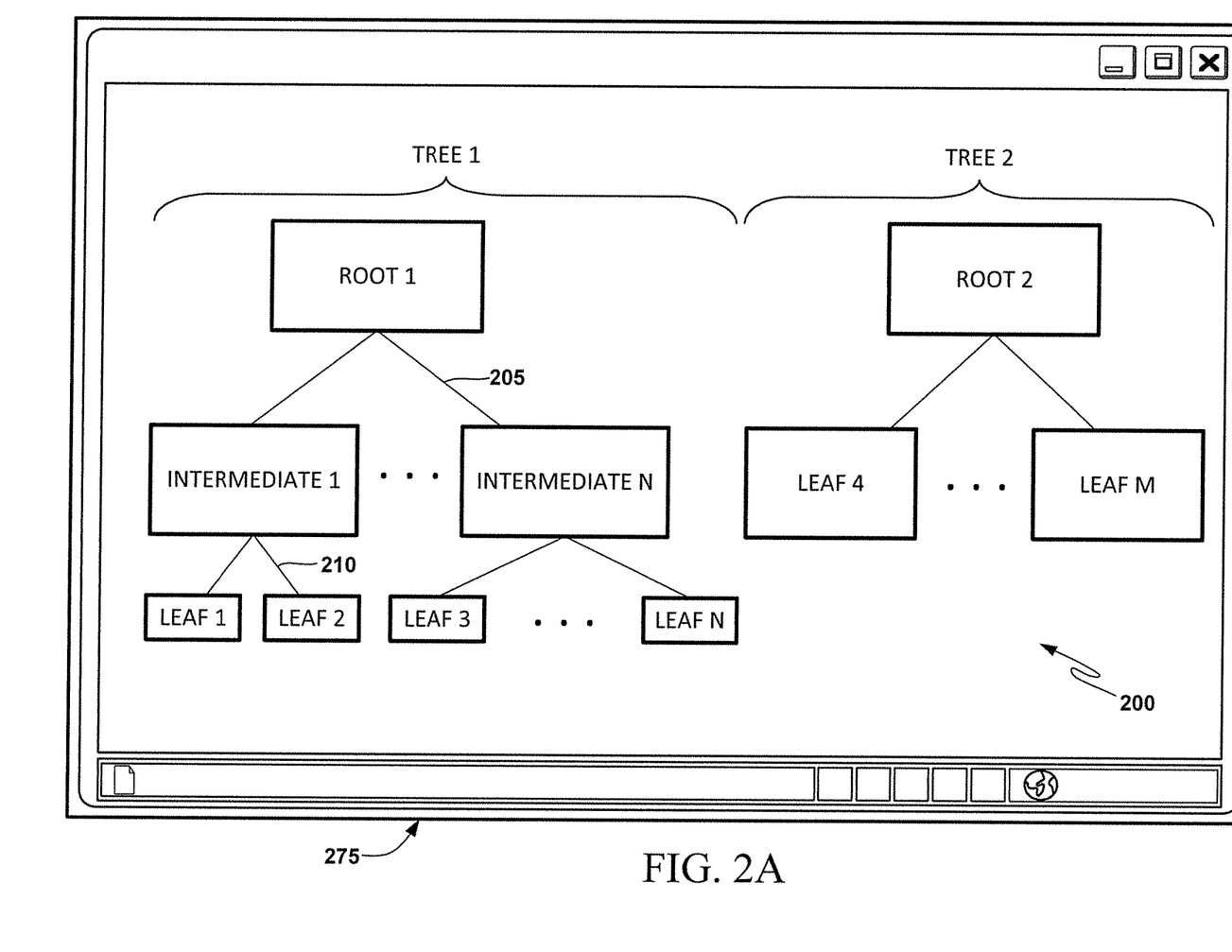
FIG. 2A illustrates relationships between nodes arranged in an aggregation hierarchy.

An illustrative arrangement of nodes created in a generic aggregation hierarchy 200 is shown in FIG. 2A. In one embodiment, the hierarchy 200 is created and arranged by dragging and dropping the nodes into positions in the hierarchy 200 via a user interface. The nodes are arranged in the aggregation hierarchy 200 to form at least one tree, such as TREE1 for example. According to another embodiment, the aggregation hierarchy 200 can optionally include a plurality of trees, such as TREE 2 in addition to TREE 1. Thus, although both TREE 1 and TREE 2 are included in the aggregation hierarchy 200 of FIG. 2A, the aggregation hierarchy 200 can include only TREE 1, only TREE 2, or both TREE 1 and TREE 2 in the present illustrative embodiment. Yet other embodiments can include three or more trees. For simplicity to describe arrangement of the various nodes and the relationships between nodes, however, the aggregation hierarchy 200 of FIG. 2A will be described as including TREE 1 and TREE 2.

Nodes included in the aggregation hierarchy 200 can represent structural components included in the energy supply network, geographic regions supplied with energy, geographic regions from which the energy is supplied, rate classes, classes of energy customers, or any other selected classification. Each tree includes a root node representing the top-level classification of the nodes in that tree. In TREE 1, for example, ROOT 1 is the root node. INTERMEDIATE 1 and INTERMEDIATE N are intermediate nodes depending directly from ROOT 1 (e.g., child nodes), as indicated by graphical links 205 connecting INTERMEDIATE 1 and INTERMEDIATE N to ROOT 1. The letter "N" of INTERMEDIATE N is used to indicate that there can be any number of intermediate nodes. The intermediate nodes INTERMEDIATE 1 and INTERMEDIATE N represent subclasses of the top-level class of constituents of ROOT 1.

Further, there can be multiple layers of intermediate nodes depending directly or indirectly from a root node in a tree. For example, a plurality of intermediate nodes (not shown) can be dragged and dropped to depend from INTERMEDIATE 1 in FIG. 2A. Such nodes can represent subclasses of the constituents represented by INTERMEDIATE 1.

TREE 1 also includes one or more leaf nodes LEAF 1, LEAF 2, LEAF 3, . . . , LEAF N, where the letter "N" is again used to indicate that there can be any number leaf nodes. The leaf nodes are the nodes of a tree furthest removed from their respective root node along the branches depending from that root node. The leaf nodes can depend from intermediate nodes, and represent subclasses of the constituents of the intermediate nodes from which the leaf nodes depend. Using TREE 1 of FIG. 2A as an example, LEAF 1 and LEAF 2 are arranged to depend from the intermediate node INTERMEDIATE 1, as indicated by graphical links 210. The graphical links 210 can optionally be drawn between INTERMEDIATE 1 and LEAF 1 and between INTERMEDIATE 1 and LEAF 1 to appear in the aggregation hierarchy 200 that is displayed. Including the graphical links 210 in the aggregation hierarchy provides a clear indication of the relationship between the leaf nodes LEAF 1 and LEAF 2 and the intermediate node INTERMEDIATE 1.

In TREE 1 of the aggregation hierarchy 200, at least one intermediate node is arranged between the root node ROOT 1 and the leaf nodes LEAF 1, LEAF 2, LEAF 3, . . . , LEAF N. According to another embodiment, however, the leaf nodes furthest removed from their respective root node in a tree can depend directly from the root node. As an example, TREE 2 of the aggregation hierarchy 200 in FIG. 2A includes the root node ROOT 2 and two leaf nodes LEAF 4 and LEAF M. LEAF M is a generic representation indicating that any number of leaf nodes, optionally a plurality, can depend directly from the root node ROOT 2. According to the present example, the leaf nodes LEAF 4 and LEAF M represent subclasses of the top-level constituents of ROOT 2. Thus, the root nodes ROOT 1 and ROOT 2 are the top-level classifications of constituents in their respective trees. The leaf nodes LEAF 1, LEAF 2, LEAF 3, . . . , LEAF N and the leaf nodes LEAF 4 and LEAF M are the subclasses of constituents furthest removed from the root node in their respective trees. The intermediate node INTERMEDIATE 1 is arranged within the aggregation hierarchy 200 between the root node ROOT 1 and leaf nodes LEAF 1 and LEAF 2. The intermediate node INTERMEDIATE 2 is arranged within the aggregation hierarchy 200 between the root node ROOT 1 and leaf nodes LEAF 3 and LEAF N.

Figure 2B:
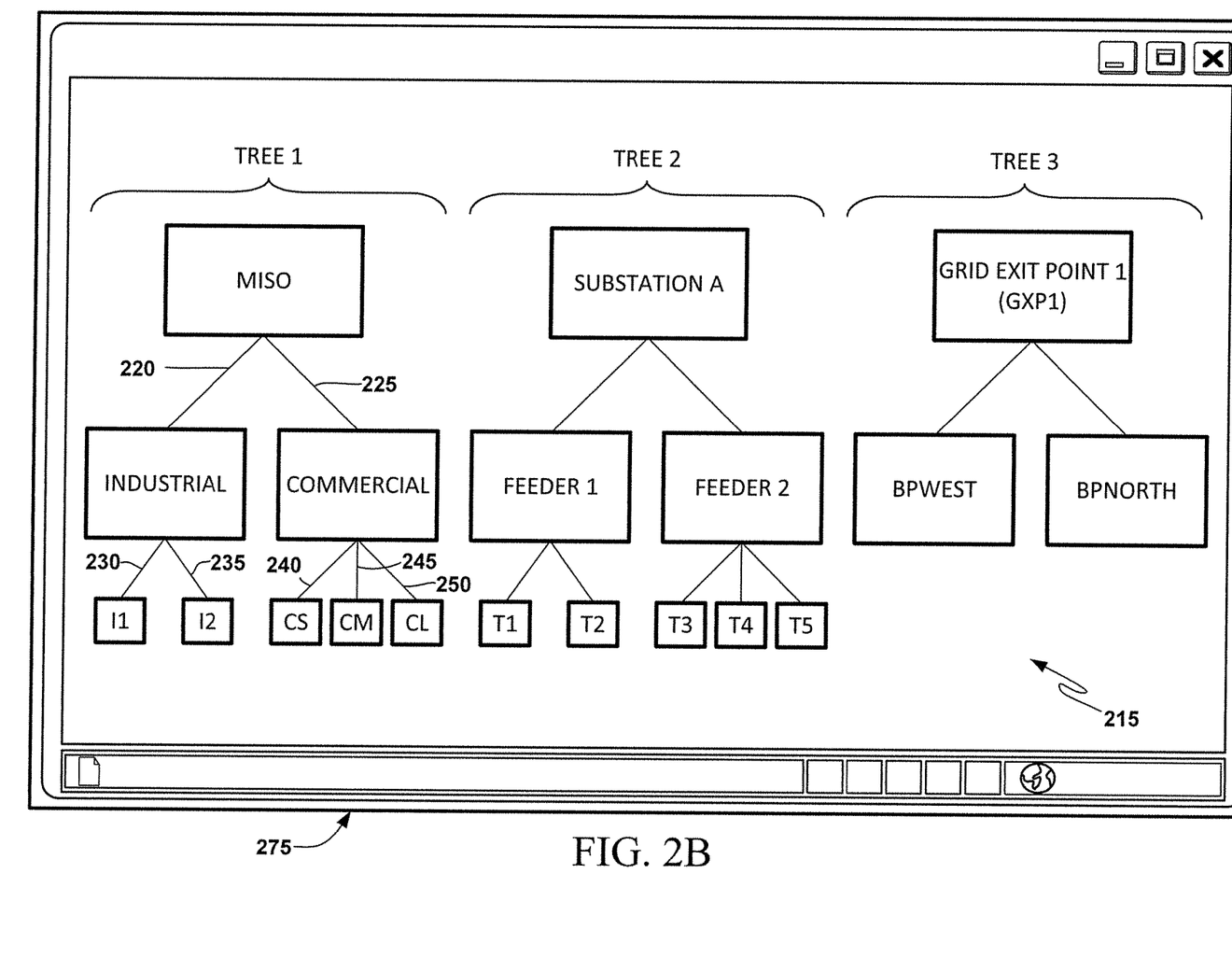
FIG. 2B shows an illustrative example of an aggregation hierarchy for aggregating energy consumption data.

The aggregation hierarchy 200 is described above with reference to FIG. 2A to illustrate the general relationships between root nodes, intermediate nodes and leaf nodes arranged in trees via drag and drop operations. An illustrative example of a specific aggregation hierarchy 215 including nodes for aggregating energy consumption data for an energy supply network is shown in FIG. 2B. As shown, an INDUSTRIAL intermediate node has been dragged and dropped to depend from a MISO root node. The MISO root node represents a market supplied by an energy supplier such as the Midcontinent Independent System Operator ("MISO"). The relationship between the MISO root node and the INDUSTRIAL intermediate node indicates that an industrial customer class is a sub-class of the customers represented by the MISO root node. Likewise, a "COMMERCIAL" intermediate node has been dragged and dropped beneath the MISO root node. The relationship of the MISO root node and the COMMERCIAL intermediate node indicates that a commercial customer class is a sub-class of the customers represented by the MISO root node. Optional connectors 220, 225 can appear in the aggregation hierarchy 215 to make the dependence of nodes explicit.

A plurality of leaf nodes, including leaf nodes I1 and I2 in FIG. 2B, depend from the INDUSTRIAL intermediate node. Leaf node I1 represents a subclass of the constituents of the INDUSTRIAL intermediate node that fall within the industrial rate class I1 for electric energy. Leaf node I2 represents a subclass of the constituents of the INDUSTRIAL intermediate node that fall within the rate class I2 for electric energy. As new industrial rate classes are created, new industrial rate class leaf nodes can be dragged and dropped into the aggregation hierarchy 215 to depend from the INDUSTRIAL intermediate node. Similarly, if an existing rate class represented by one of the leaf nodes I1 and I2 is eliminated, the corresponding leaf node can be dragged off of the aggregation hierarchy 215 or otherwise deleted. Graphical links 230, 235 can optionally be inserted into the aggregation hierarchy 215 to explicitly identify the dependency of the leaf nodes I1 and I2, respectively, from the INDUSTRIAL intermediate node.

A plurality of leaf nodes, including leaf nodes CS, CM and CL in FIG. 2B, depend from the COMMERCIAL intermediate node. Leaf nodes CS, CM and CL represent subclasses of the constituents of the COMMERCIAL intermediate node that fall within the commercial rate classes CS, CM and CL, respectively, for electric energy. As new commercial rate classes are created, new commercial rate class leaf nodes can be dragged and dropped into the aggregation hierarchy 215 to depend from the COMMERCIAL intermediate node. Similarly, if an existing rate class represented by one of the leaf nodes CS, CM and CL is eliminated, the corresponding leaf node can be dragged off of the aggregation hierarchy 215 or otherwise deleted. Graphical links 240, 245, 250 can optionally be inserted into the aggregation hierarchy 215 to explicitly identify the dependency of leaf nodes CS, CM and CL, respectively, from the COMMERCIAL intermediate node. Collectively, the MISO root node, the INDUSTRIAL and COMMERCIAL intermediate nodes, and the leaf nodes I1, I2, I3, CS, CM and CL make up TREE 1 of the illustrative aggregation hierarchy 215 in FIG. 2B.

The MISO root node of TREE 1 in the aggregation hierarchy 215 is described as representing the energy supplier MISO, broken down by customer classes and rate classes. TREE 2 of the aggregation hierarchy 215 represents hardware components of the energy supply network. A SUBSTATION A root node represents a specific substation within the energy supply network. Intermediate nodes FEEDER 1 and FEEDER 2 represent different voltage power lines that conduct power from the substation represented by the SUBSTATION A root node to distribution transformers. The distribution transformers provide the final voltage transformation in the electric power distribution system, stepping down the voltage conducted by the voltage power lines to the level used by the customer. The distribution transformers supplied with electric energy by the voltage power lines represented by the FEEDER 1 intermediate node are represented by leaf nodes T1 and T2. The distribution transformers supplied with electric energy by the voltage power lines represented by the FEEDER 2 intermediate node are represented by leaf nodes T3, T4 and T5.

A third tree, TREE 3, included in the aggregation hierarchy 215 of FIG. 2B includes a GXP1 root node, representing an exit point of the energy supply network where supplemental energy can be introduced to compensate for high demand. The constituents of the GXP1 root node can include customers that receive supplemental electric energy via the grid exit point, geographic regions serviced by the grid exit point, hardware components utilized to supply power via the grid exit point, or any other data point pertaining to the grid exit point. Unlike TREE 1 and TREE 2, TREE 3 is devoid of any intermediate nodes. Instead, a BPWEST leaf node and a BPNORTH leaf node are arranged to depend directly from the GXP1 root node. Being the nodes furthest removed from the GXP1 root node in TREE 3, the BPWEST leaf node and a BPNORTH leaf node are leaf nodes instead of intermediate nodes. The BPWEST leaf node represents a balancing point that supplies supplemental electric energy to a western region to balance the supply of electric energy with excessive demand. Similarly, The BPNORTH leaf node represents a balancing point that supplies supplemental electric energy to a northern region to balance the supply of electric energy with excessive demand.

Although a specific number of trees, each including a specific number of nodes, are shown in the aggregation hierarchy 215, the embodiment of the aggregation hierarchy 215 in FIG. 2B is used merely as an example. The present disclosure is not limited to the exact number and arrangement of trees or nodes in the aggregation hierarchy 215 shown in the drawings. The aggregation hierarchy 215 can include one or a plurality of trees, each including at least a plurality of leaf nodes, and optionally a plurality of intermediate nodes. Description of the various embodiments of the system and process hereinafter will be given with reference to the aggregation hierarchy 215.

Referring once again to FIG. 1, the system 100 includes a settlement module 110, which can also be implemented as part of a computer such as the computing device 600 of FIG. 6. The settlement module 110 is configured to create different settlement points (FIG. 2C: e.g., SP1, SP2, SP3 . . . SPN). Each settlement point defines a different type of aggregation and/or different group of data to be aggregated from the energy consumption data within the aggregation hierarchy 215 based on a selected set of nodes. Each settlement point includes one or more energy consumption characteristics 120 selected from a database 115, and an aggregation algorithm 125 defining how the energy consumption data corresponding to the selected set of nodes is to be aggregated by the settlement point. The aggregation algorithm 125 can be a defined algorithm selected from the database 115, a user-specified algorithm, or a defined algorithm selected from the database 115 and edited by the user.

The database 115 can be stored locally by a computer-readable medium provided to the computing device 600, or the database can be stored remotely from the computing device 600, and accessed over a LAN or WAN. The energy consumption characteristics 120 are the types of energy consumption data to be aggregated as defined and identified by the settlement points. For the illustrated embodiment shown in FIG. 1, examples of the energy consumption characteristics include, but are not limited to: kilowatts, kilowatt hours, kilowatt hours-scalar, power consumed by one or more rate classes, and time of power consumption. However, any type of data related to the consumption of electric energy can be included in the list of energy consumption characteristics 120 stored by the database 115.

Each settlement point can independently be created to aggregate data according to the algorithm 125, which can be selected by a user from among available aggregation operations stored in the database 115. The algorithm 125 defines how measured values for each of the selected energy consumption characteristics 120 are to be aggregated at the settlement point. For the illustrated example shown in FIG. 1 and in one embodiment, the available algorithms 125 may include: a summing algorithm that determines the sum of measured values for a selected energy consumption characteristic 120, an averaging algorithm that determines the average of the measured values for a selected energy consumption characteristic 120, a "max" algorithm that determines the maximum of the measured values for a selected energy consumption characteristic 120, a "min" algorithm that determines the minimum of the measured values for a selected energy consumption characteristic 120, and any other selected mathematical, logical or other operation. Thus, the energy consumption characteristics 120 define the types of data to be aggregated, and the aggregation algorithms 125 define how the values of the energy consumption characteristics 120 are to be aggregated.

The settlement module 110 creates a settlement point as a data object that defines parameters of an aggregation to be performed and identifies one or more user-selected leaf nodes from the aggregation hierarchy 215 that are part of the aggregation. For example, a manual selection of a plurality of leaf nodes in the aggregation hierarchy 215 can be received in response to manipulation of an input peripheral such as a computer mouse, touch screen display, and the like, provided to the computing device 600. Upon receiving the selected leaf nodes for a settlement point, a settlement graphical user interface 300 ("GUI 300") such as that shown in FIG. 3 can be displayed.

Figure 3:
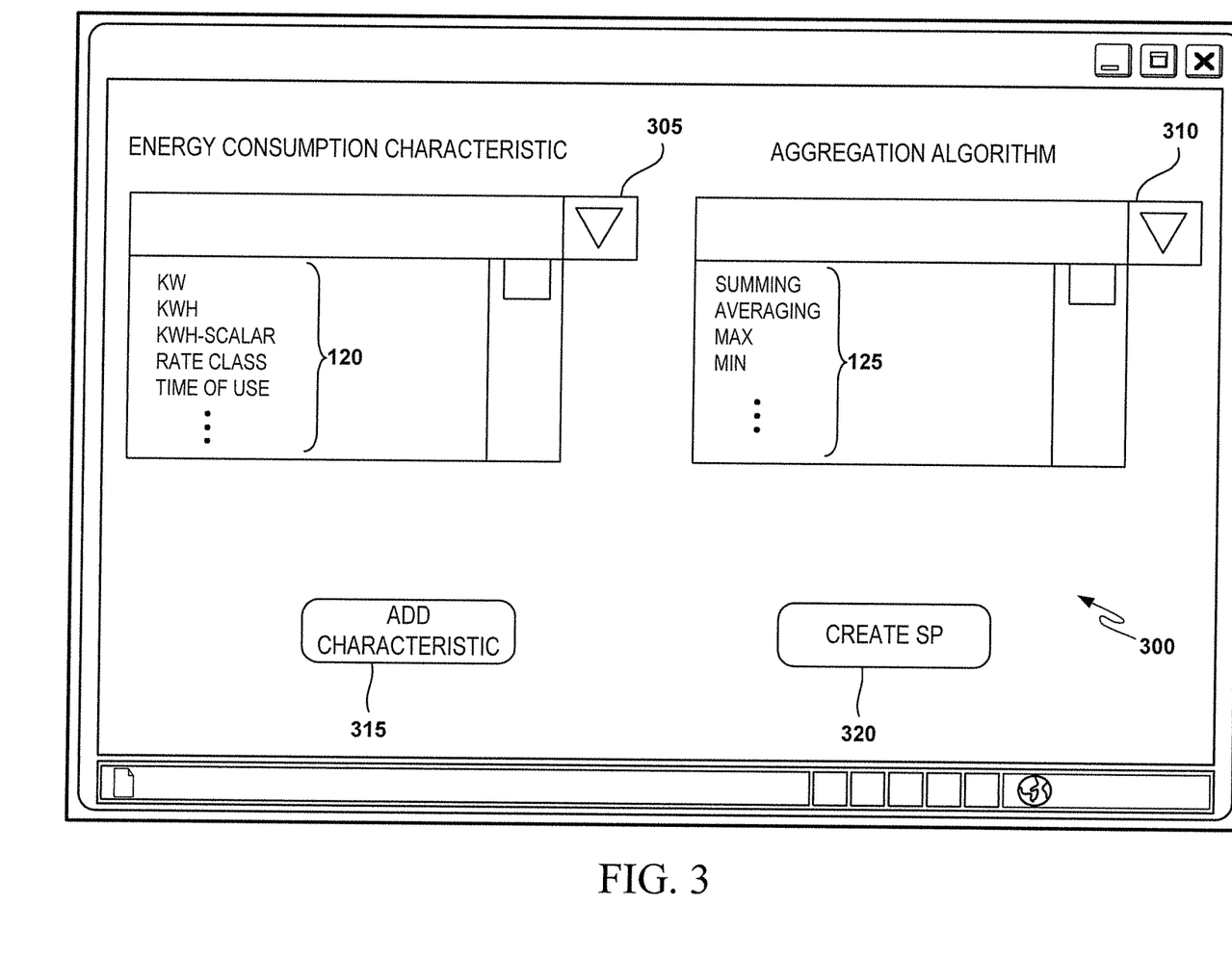
FIG. 3 illustrates an embodiment of a graphical user interface for selecting energy consumption characteristics and an aggregation algorithm to create a settlement point for a plurality of nodes.

With reference to FIG. 3, the GUI 300 includes interactive selection options such as menus from which one or more energy consumption characteristics 120 and one or more of the aggregation algorithms 125 for the settlement point being created can be selected. For the illustrative embodiment shown in FIG. 3, the GUI 300 includes a drop-down menu 305 of available energy consumption characteristics 120, the values of those selected are aggregated according to the settlement point being created. The GUI 300 also includes a drop-down menu 310 of available aggregation algorithms 125 for aggregating the values of the selected energy consumption characteristics 120 according to the settlement point being created.

To facilitate selection of multiple energy consumption characteristics 120, an add button 315 is selectable to link a selected energy consumption characteristic 120 and selected aggregation algorithm 125 to the settlement point. Each selection of the add button 315 adds the selected energy consumption characteristic 120 to the settlement point, to be aggregated according to the selected aggregation algorithm 125. Selection of the add button 315 can also clear the selections that have been added to the data object of the settlement point, allowing selection of a different energy consumption characteristic 120 and associated aggregation algorithm 125 to the settlement point. Once all selected energy consumption characteristics 120 and associated algorithms 125 have been linked, selection of a create button 320 causes the settlement module 110 to create the data object of the settlement point.

Figure 4:
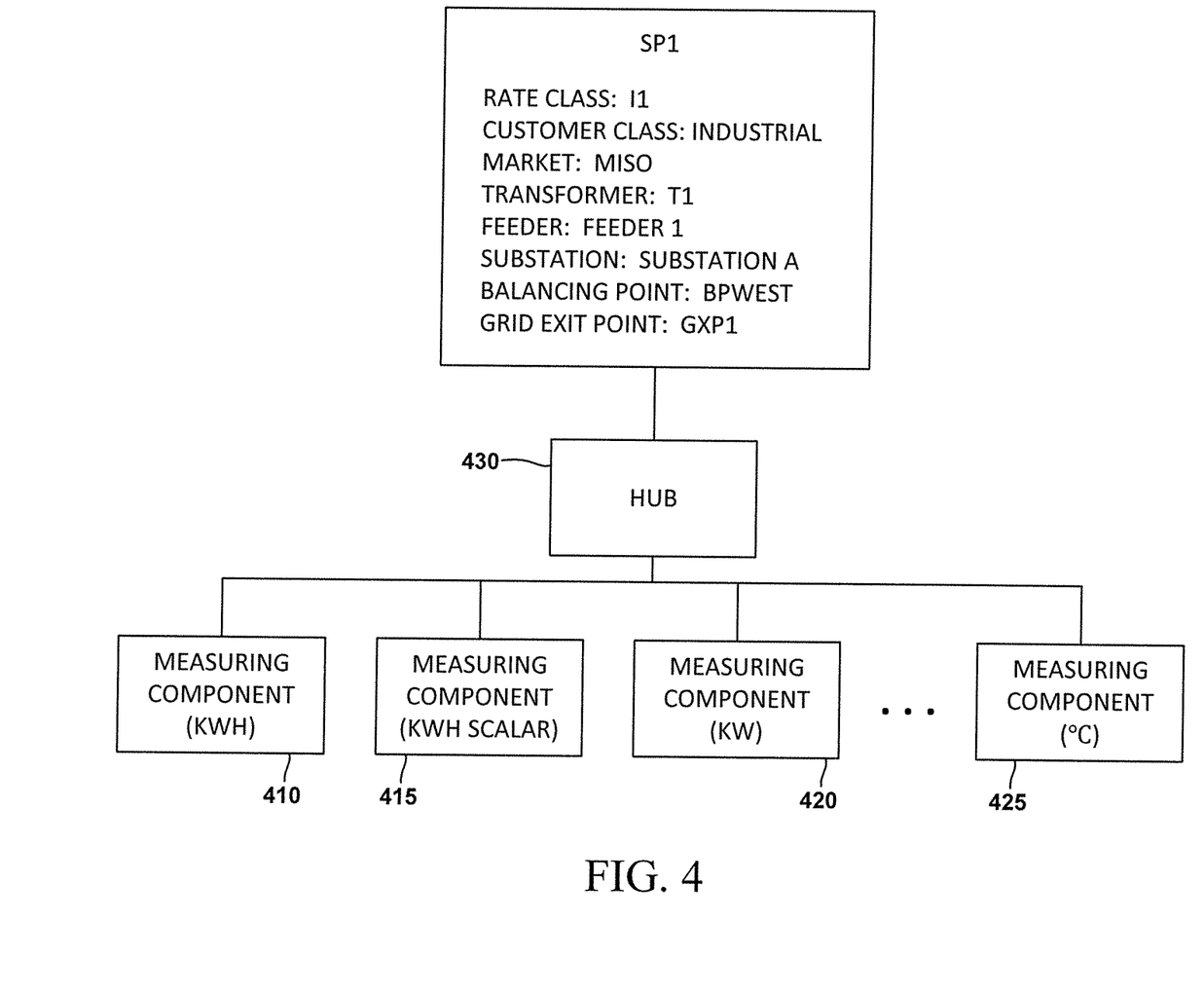
FIG. 4 illustrates an embodiment of a settlement point in communication with a plurality of measurement components, where a separate measurement component is provided to obtain values for each unit of measurement.

Each settlement point created is caused to be stored in a computer-readable memory by the settlement module 110. An example of a settlement point SP1 with defined parameters is shown in FIG. 4. The settlement point SP1 includes a record of each node identified in the path of the leaf nodes that were selected for the SP1 settlement point. For the embodiment of the SP1 settlement point in FIG. 4, the "I1," "T1" and BPWEST leaf nodes and their respective root nodes are included in the record. Further, the industrial customer class corresponding to the INDUSTRIAL intermediate node and the voltage power line corresponding to the FEEDER 1 intermediate node are also documented in the record. Thus, the settlement point SP1 includes a leaf node that depends from the root node of each tree (TREE 1, TREE 2, TREE 3) in the aggregation hierarchy 215, as indicate by graphical links 255, 260, 265, which are represented by broken lines in FIG. 2C, for performing the aggregation according to the SP1 settlement point.

Documenting the path of each node included in the path of the selected leaf nodes 215 in canonical form allows the settlement module 110 to update the settlement points that have been created to reflect any changes to those paths. For example, if the leaf node T1 is moved to depend from the FEEDER 2 intermediate node in the aggregation hierarchy 215 of FIG. 2C, the SP1 settlement point is updated by the system 100, optionally in real time, to change the path from SUBSTATION A—FEEDER 1—T1, to SUBSTATION A—FEEDER 2—T1. As a result, the SP1 settlement point remains current despite the change to the aggregation hierarchy 215.

In addition to changes of the path or dependencies of the nodes in the aggregation hierarchy 215, other changes such as the addition of a new energy consumption characteristic 120, such as a new rate class or customer class for example, may occur. These changes may result from a new node having the new rate or customer class being dragged and dropped into the aggregation hierarchy 215. The hierarchy module 105 can optionally be configured to detect such changes to the aggregation hierarchy 215 and update the database 115 to include the new rate class, customer class, or other energy consumption characteristic 120. Once the database 115 is updated, the new energy consumption characteristic 120 is available for subsequent selection from the drop-down menu 305 (FIG. 3) to be included in settlement points. Updating the database 115 also supports maintaining the content of the database 115 current.

As shown in FIG. 4, the SP1 settlement point is linked to one or more measuring components 410, 415, 420, 425, optionally through a hub 430, multiplexer or other gateway device. According to one embodiment, the measuring components 410, 415, 420, 425 include sensors that sense or otherwise measure values of the energy consumption characteristics 120 selected for the respective settlement point. For example, the measuring component 420 can include a current sensor provided to hardware included in the energy supply network to measure electric current. The measured current can be utilized to determine power consumption at the location of the sensor in kilowatts. According to other embodiments, the measuring components 410, 415 may include a timer and current sensor that can be used to determine power consumption in terms of kilowatt-hours, or a time at which electric energy is consumed, for example. Another measuring component 425 can include a temperature sensor for sensing a temperature. The foregoing examples of the sensing technology provided to the measuring components are not exhaustive, and any device that can record, sense, or otherwise obtain or store values of the energy consumption characteristics 120 selected for the settlement point. These values are recorded or otherwise linked to the SP1 settlement point as shown in FIG. 4 for use during an aggregation performed on energy consumption data corresponding to the leaf nodes I1, T1 and BPWEST.

According to another embodiment, each measuring component 410, 415, 420, 425 can optionally include one or more non-transitory computer-readable storage devices storing measured values of the energy consumption characteristics 120. Two or more of the measuring components 410, 415, 420, 425 can each include a separate storage device, or can occupy separate sectors of the same storage device. For example, the storage device(s) can be implemented as part of the disks 655 operatively connected to the computer 615 as discussed with reference to FIG. 6. According to another embodiment, the storage device(s) can be network accessible storage locations. The one or more storage devices of the measuring components 410, 415, 420, 425 are thus locations within the system 100 from where the measured values can be obtained, or from where the measured values can be transmitted to serve as input values for the aggregations. The values stored by the storage device of each measuring component 410, 415, 420, 425 can be measured and output by one or more of the sensors of the energy supply network mentioned above, for example.

The system also includes a receiver 130 (FIG. 1) that receives values for each of the selected energy consumption characteristics 120 included in the settlement points, as obtained by a measurement system, represented generally at 155 in FIG. 1. The measurement system 155 includes a plurality of the measuring components 410, 415, 420, 425 (FIG. 4) included in the energy supply network and described above. Each measuring component 410, 415, 420, 425 can optionally be dedicated to measuring and/or storing a value of a specific one of the energy consumption characteristics 120. The receiver 130 can include network communication hardware, firmware or software, and can be implemented as part of the computing device 600 of FIG. 6. The receiver 130 can be configured to receive communications conveying the measured values of the energy consumption characteristics 120 over a LAN, WAN, or a combination thereof.

An aggregator module 135 (FIG. 1), which can optionally be implemented as part of the computing device 600 of FIG. 6, controls aggregation of energy consumption data in accordance with the settlement points. The aggregations are performed by the aggregator module 135 according to the settlement points linked to their respective the leaf nodes within the aggregation hierarchy 215, as defined in the settlement points. As noted above, aggregated values of each settlement point are determined using the aggregation algorithms 125 with the measured values of the energy consumption characteristics 120 of the respective settlement points.

Figure 2C:
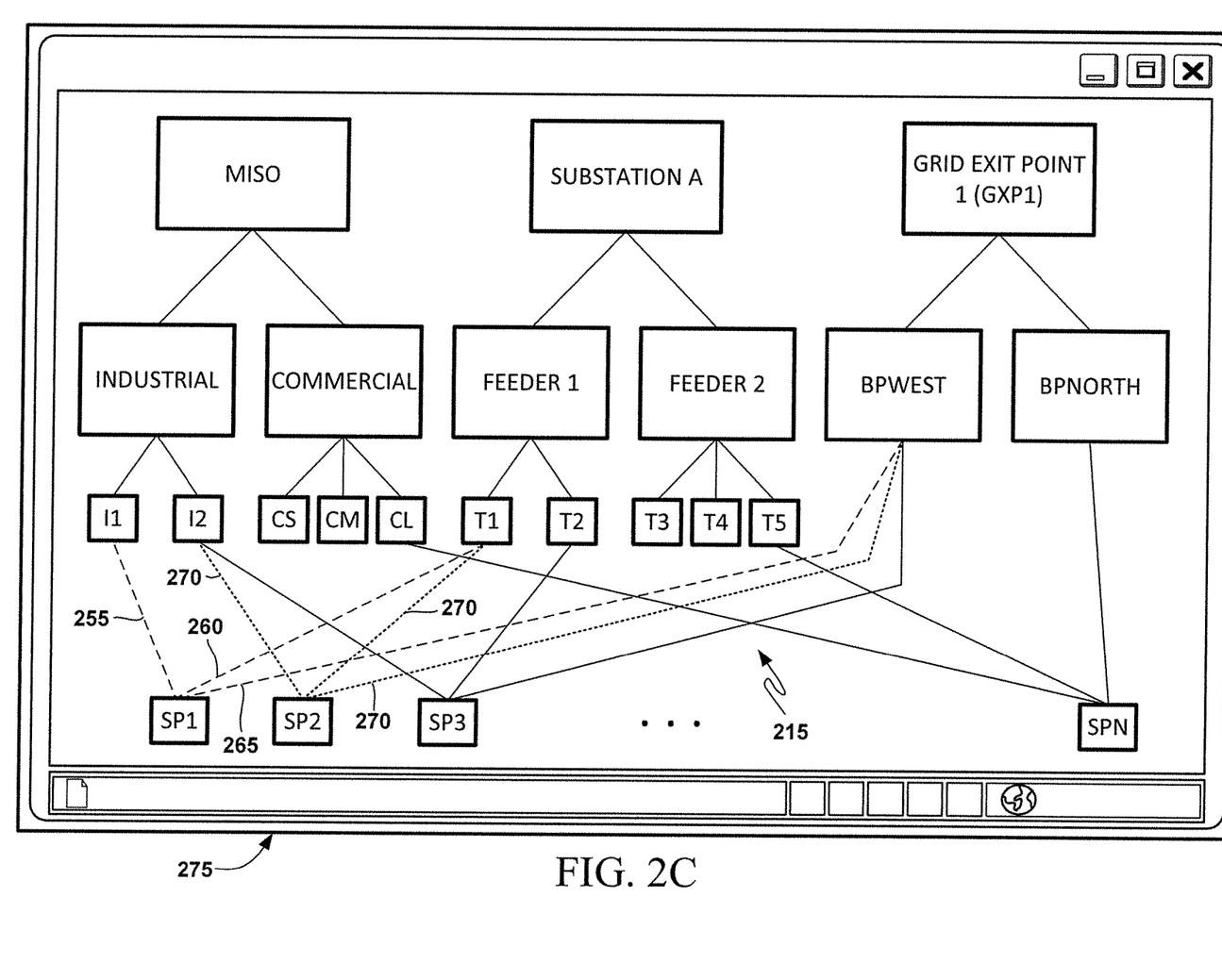
FIG. 2C shows the embodiment of the aggregation hierarchy in FIG. 2B, including leaf nodes linked to settlement points defining energy consumption data aggregations to be performed.

By way of example, the SP2 settlement point (FIG. 2C) may be configured to determine the total power consumption (in kilowatt hours ("kWh")) by industrial customers in rate class I2, supplied by transformer T1, and accounting for any supplemental power supplied by the balance point BPWEST, as indicated by the links 270, shown in small dashed lines in FIG. 2C, for a specific usage period. This SP2 settlement point is defined by at least the energy consumption characteristic kWh, and the "summing" aggregation algorithm. Based on this SP2 settlement point, the kWh of each leaf node linked to the SP2 settlement point is measured by their respective measuring components, the measured values are received by the receiver 130, and conveyed to the aggregator module 135. The aggregator module 135 applies the summing operation specified by the SP2 settlement point to the measured kWh of the leaf nodes 215 specified by the SP2 settlement point to determine the aggregated values.

The aggregated values are transmitted to a report module 140, which can optionally be implemented as part of the computing device 600 of FIG. 6. The report module 140 generates a data structure including the aggregated values in compliance with a market reporting obligation or an internal data processing requirement imposed by the energy supplier. According to another embodiment, the report module 140 prepares the aggregated values as two separate data structures: one in compliance with a market reporting obligation and another in compliance with an internal data processing requirement imposed by the energy supplier. The report module 140 transmits the one or more data structures to at least one destination terminal 145 over a LAN or WAN. The destination terminal can be a server maintained on behalf of a utility industry regulatory body, or an internal network-accessible storage device maintained by, or on behalf of the electric utility supplying the electric energy.

The system 100 can optionally also include a rules engine 150 (FIG. 1) that predicts excessive changes to previously-determined aggregation values. The prediction of the rules engine 150 can be based on current aggregation values determined by the aggregator module 135 using measured values of the energy consumption characteristics 120 measured after the previous aggregation values were determined. Market reporting obligations can require an aggregation result to be determined a plurality of times as a result of changes or updates to the aggregation hierarchy 215, changes to market-specific rules or reporting obligations, changes in the measured values of the energy consumption characteristics 120, or other factors that influence the aggregation of energy consumption data. Small changes in a previously-determined aggregation value can be accounted for during subsequent updates to the previously-determined aggregation value and a final reconciliation process. The goal of the final reconciliation process is to ensure each energy market participant has been properly compensated, and has properly compensated other participants, for the actual energy supplied or consumed during a usage period. However, large fluctuations requiring expensive reconciliation payments can impose financial hardships on the market participants affected. Inaccurate initial aggregations that would experience excessive changes (e.g., ±10%) based on any changes or updates in the market conditions, measured values or other factors should be avoided.

The rules engine 150 can store one or more predictive algorithms that can be used to predict whether a previous aggregation result based on a settlement point will experience an excessive change based on current measured values. Because aggregations are computer-processor intensive operations and time consuming, re-aggregating a previous aggregation result would interfere with current aggregation operations. To avoid such a conflict, the predictive algorithms of the rules engine 150 utilize simplified computations, optionally on a small data set compared to the computations and data sets involved in a complete aggregation in accordance with each of the settlement points. As a result, an excessive change can be predicted without repeating the full previous aggregation. If the rules engine 150 predicts the expected change of a previous aggregation result is not excessive (e.g., less than 10%), the previous aggregation result is left unchanged and an unnecessary repeated aggregation of the previous aggregation result is avoided.

If, however, the previous aggregation result for a given settlement point during a previous usage period is expected to change by at least a defined threshold (e.g., ±10% or more) based on up-to-date energy consumption data for that usage period, the rules engine 150 initiates a revision of the settlement point used for the original aggregation. For example, the rules engine 150 can cause a notification to be transmitted, alerting an administrator of the predicted change to the previous aggregation result. According to such an embodiment, initiating the revision of the settlement point involves alerting the administrator that a revision of the offending settlement point(s) may be appropriate. The rules engine 150 can also identify the settlement point determined to be primarily responsible for the change of the previous aggregation result.

According to other embodiments, the rules engine 150 can adjust a value, mathematical operator, or other component of the aggregation algorithm 125 associated with the settlement point as a result of the prediction. For example, the rules engine 150 can utilize an iterative process to narrow in on a change to the aggregation algorithm 125. Regardless of how the change is implemented by the rules engine 150, the updated algorithm of the settlement point can be used to re-perform the previous aggregation that produced the aggregation result expected to experience an excessive change.

Figure 5:
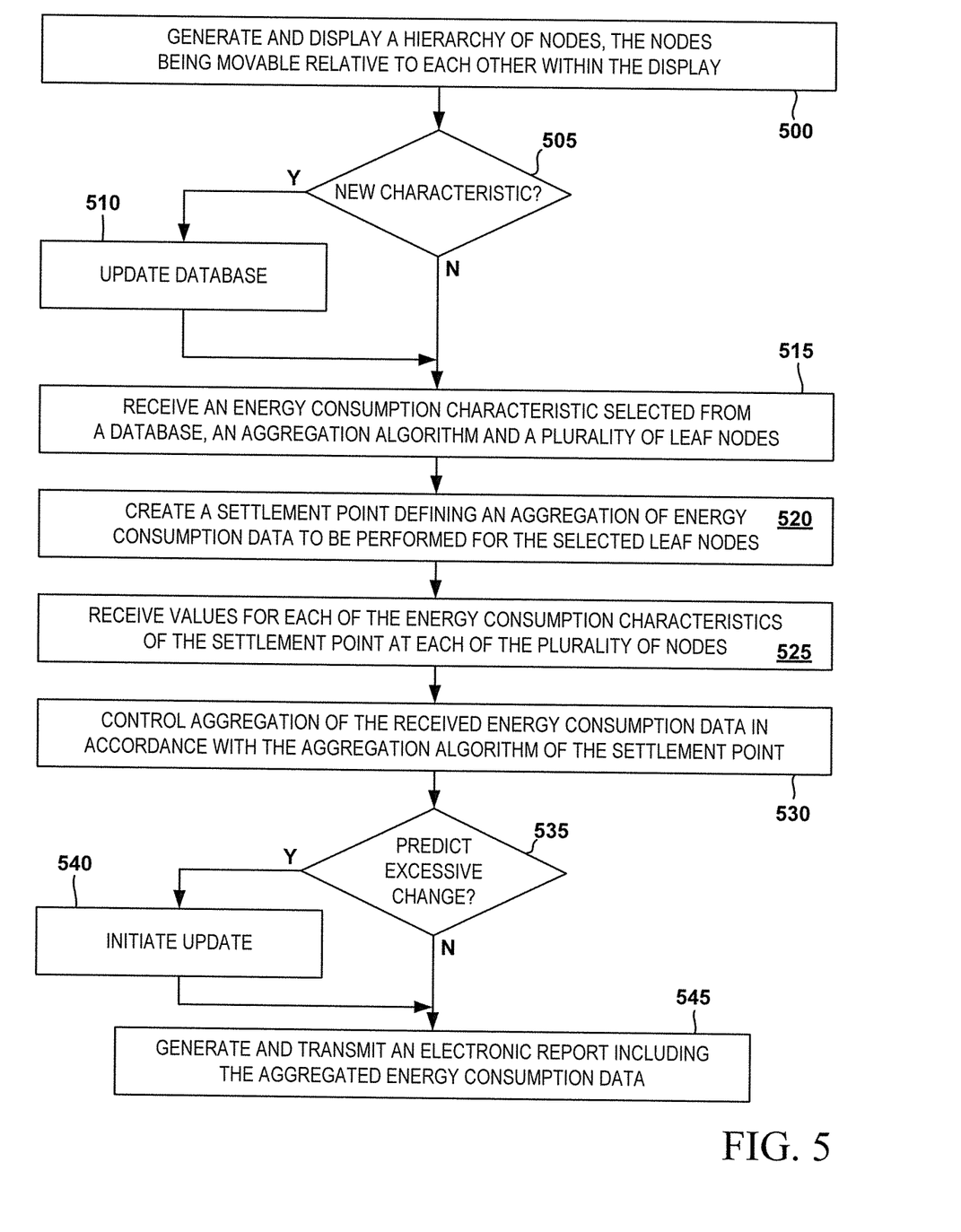
FIG. 5 a flow diagram illustrating an embodiment of a process for aggregating energy consumption data.

A process of aggregating energy consumption data can be understood with reference to the flow diagram of FIG. 5. At step 500, the hierarchy module 105 creates and generates a graphical representation of an energy supply network. Nodes are arranged in an aggregation hierarchy 200 in response to receiving drag and drop input indicating an arrangement of the nodes from a user. The hierarchy module 105 determines, at step 505, whether any new energy consumption characteristics (e.g., characteristics not already included in the database 115) are introduced to the aggregation hierarchy 200 by the nodes. If so, the database 115 is updated at step 510 to include the new energy consumption characteristic, which is rendered selectable during the creation of settlement points as a result of being added to the database 115.

If it is determined by the hierarchy module 105 at step 505 that a new characteristic has not been introduced, a user selection is received by the settlement module 110 at step 515. The user selection includes one or more energy consumption characteristics 120 selected from the database 115, an aggregation algorithm selected from the database 115, and a plurality of leaf nodes for which an aggregation is to be performed according to the settlement point being created. The settlement point including the selected energy consumption characteristics 120, algorithm 125 and leaf nodes is created by the settlement module 110 at step 520.

Values of each of the selected energy consumption characteristics 120 of the settlement point, collected at each of the plurality of leaf nodes linked to the settlement point, are received by the receiver 130 at step 525. The aggregator module 135 controls aggregation at step 530 to process the received values according to the user-selected algorithm to determine the aggregated values. The aggregated values are evaluated by the rules engine 150 using a predictive algorithm to determine if previously-generated aggregated values are expected to experience an excessive change based on the current market-specific rules, market reporting obligations, aggregation hierarchy 200, received values, or any other information that became available after the previous aggregation, at step 535. If so, an update of the energy consumption characteristics, the aggregation algorithm or other aspect of the settlement point is initiated at step 540 before an electronic report including the aggregated energy consumption data is generated and transmitted to the appropriate destination(s) at step 545. Otherwise, the update is not initiated at step 540 prior to generating and transmitting the electronic report.

The above process can optionally be repeated a plurality (e.g., three or more, or four or more) times for the same usage period before a final settlement of the accounts for that usage period occurs.

FIG. 6 illustrates an example of a computing device 600 that is configured and/or programmed with one or more of the example systems and methods described herein, and/or equivalents. The illustrative example of a computing device 600 may be a computer 615 that includes a processor 620, a memory 635, and I/O ports 645 configured as the receiver 130 operably connected by a bus 625. In one embodiment, the computer 615 may include logic of the hierarchy module 105, the settlement module 110, the aggregator module 135, the report module 140, or the rules engine 150, configured to facilitate the system 100 and/or the method described with respect to FIGS. 1-5. In different embodiments, the logic of the hierarchy module 105, the settlement module 110, the aggregator module 135, the report module 140, or the rules engine 150 may be implemented in hardware, a non-transitory computer-readable medium 605 with stored instructions, firmware, and/or combinations thereof. While the logic of the hierarchy module 105, the settlement module 110, the aggregator module 135, the report module 140, or the rules engine 150 is illustrated as a hardware component attached to the bus 625, it is to be appreciated that in other embodiments, the logic of one or more of these modules could be implemented in the processor 620, stored in memory 635, or stored in disk 655.

In one embodiment, logic of the hierarchy module 105, the settlement module 110, the aggregator module 135, the report module 140, or the rules engine 150, or the computer 615 is a means (e.g., structure: hardware, non-transitory computer-readable medium, firmware) for performing the actions described. In some embodiments, the computing device 600 may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 615 as data 610 that are temporarily stored in memory 635 and then executed by processor 620.

The logic of the hierarchy module 105, the settlement module 110, the aggregator module 135, the report module 140, or the rules engine 150 may also provide means (e.g., hardware, non-transitory computer-readable medium 905 that stores executable instructions, firmware) for performing rule based source sequencing for allocation.

Generally describing an example configuration of the computer 615, the processor 620 may be a variety of various processors including dual microprocessor and other multi-processor architectures. The memory 635 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 655 may be operably connected to the computer 615 via, for example, the I/O interface 640 (e.g., card, device) and the I/O ports 645. The disks 655 may be, for example, a magnetic disk drive, a solid state disk drive, a floppy disk drive, a tape drive, a Zip drive, a flash memory card, a memory stick, and so on. Furthermore, the disks 655 may be a CD-ROM drive, a CD-R drive, a CD-RW drive, a DVD ROM, and so on. The memory 635 can store a process, such as within the non-transitory computer-readable medium 605, and/or data 610, for example. The disk 655 and/or the memory 635 can store an operating system that controls and allocates resources of the computer 615.

The computer 615 may interact with input/output (I/O) devices via the I/O interfaces 640 and the I/O ports 645. The I/O devices may be, for example, a keyboard, a microphone, a pointing and selection device, cameras, video cards, displays, the disks 655, the network devices 650, and so on. The I/O ports 645 may include, for example, serial ports, parallel ports, and USB ports. I/O controllers 630 may connect the I/O interfaces 640 to the bus 625.

The computer 615 can operate in a network environment and thus may be connected to the network devices 650 via the I/O interfaces 640, and/or the I/O ports 645. Through the network devices 650, the computer 615 may interact with a network. Through the network, the computer 615 may be logically connected to remote computers (e.g., the computer 615 may reside within a distributed computing environment to which clients may connect). Networks with which the computer 615 may interact include, but are not limited to, a local area network (LAN), a new area network (WAN), and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure" or "data object", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons who consume energy from a utility, computers or other devices operated by or on behalf of such persons, or combinations thereof.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer cause the computer to:
    generate and display, by at least the processor, a hierarchy of nodes in a graphical representation of an energy supply network as a result of a graphical input instruction received by the computer, wherein the nodes store energy consumption data, and are selectable to identify where aggregations of the energy consumption data are to be performed;
    maintain, by at least the processor, a database comprising characteristics of the energy consumption data for the nodes in the hierarchy;
    create, by at least the processor, a settlement point to define an aggregation of the energy consumption data based on at least data from a plurality of nodes identified from the hierarchy, the plurality of nodes comprising a leaf node, wherein the created settlement point comprises: (i) one or more characteristics selected from the database, (ii) an algorithm defining the aggregation to be performed, and (iii) a record of each node included in a path between the leaf node and a root node corresponding to the leaf node, the record documenting the path in a canonical form;
    receive, by at least the processor, values for each of the characteristics included in the settlement point;
    update, by at least the processor, the record of each node included in the path as a result of a change made to the path through another graphic input instruction received by the computer to generate an updated record for the settlement point;
    execute and control the aggregation, by at least the processor, of the energy consumption data according to the updated record for the settlement point; and
    generate, by at least the processor, an electronic report comprising the aggregated energy consumption data.

2. The non-transitory computer-readable medium of claim 1, further comprising instructions that when executed by at least the processor cause the computer to:
predict, by at least the processor, that a previous aggregation result for the settlement point during a previous usage period will change by at least a defined threshold based on the aggregation of the energy consumption data; and
initiate a revision of the algorithm associated with the settlement point as a result of the prediction.

3. The non-transitory computer-readable medium of claim 2, wherein the instructions, when executed by at least the processor, cause the computer to re-aggregate the energy consumption data during the previous usage period after the revision of the algorithm.

4. The non-transitory computer-readable medium of claim 1, further comprising instructions that when executed by at least the processor cause the computer to transmit the electronic report to a plurality of different destinations over a computer network, the different destinations comprising: (i) a market reporting terminal, and (ii) an internal storage device.

5. The non-transitory computer-readable medium of claim 1, further comprising instructions that when executed by at least the processor cause the computer to repeat the aggregation of the energy consumption data at a plurality of different times.

6. The non-transitory computer-readable medium of claim 1, wherein the instructions, when executed by at least the processor, cause the computer to render the nodes graphically movable within the hierarchy in response to a drag and drop input operation as the graphical input instruction.

7. The non-transitory computer-readable medium of claim 1, further comprising instructions that when executed by at least the processor cause the computer to:
recognize, by at least the processor, a new characteristic of the energy supply network; and
in response to recognizing the new characteristic, update the database to include the new characteristic for subsequent inclusion of the new characteristic in settlement points.

8. A computing system, comprising:
at least one processor connected to at least one memory comprising a non-transitory computer readable medium;
a hierarchy module stored on the memory and including instructions that when executed by at least the processor cause a processor to generate and display a hierarchy of nodes in a graphical representation of an energy supply network as a result of a graphical input instruction received by the computing system, wherein the nodes store energy consumption data, and are selectable to identify where aggregations of the energy consumption data are to be performed;
a database stored on the memory and comprising characteristics of the energy consumption data for the nodes in the hierarchy;
a settlement module stored on the memory and including instructions that when executed by at least the processor cause the processor to: (A) create a settlement point to define an aggregation of the energy consumption data based on at least data from a plurality of nodes identified from the hierarchy, the nodes comprising a leaf node, wherein the created settlement point comprises: (i) one or more characteristics selected from the database, (ii) an algorithm defining the aggregation to be performed, and (iii) a record of each node included in a path between the leaf node and a root node corresponding to the leaf node, the record documenting the path in a canonical form; and (B) update the record of each node included in the path as a result of a change made to the path through another graphic input instruction received by the computing system to generate an updated record for the settlement point;
a receiver that receives values for each of the characteristics included in the settlement point; and
an aggregator module stored on the memory and including instructions that when executed by at least the processor cause the processor to execute and control aggregation of the energy consumption data according to the updated record for the settlement point; and
a report module stored on the memory and including instructions that when executed by at least the processor cause the processor to generate an electronic report comprising the aggregated energy consumption data.

9. The computing system of claim 8, further comprising a rules engine stored on the memory and including instructions that when executed by at least the processor cause the processor to:
predict that a previous aggregation result for the settlement point during a previous usage period will change by at least a defined threshold based on the aggregation of the energy consumption data; and
initiate a revision of the algorithm associated with the settlement point as a result of the prediction.

10. The computer system of claim 9, wherein the rules engine includes instructions that are configured to, when executed by at least the processor, cause the aggregator module to initiate re-aggregation of the energy consumption data during the previous usage period after the revision of the algorithm.

11. The computer system of claim 8, wherein the report module further includes instructions that when executed by at least the processor cause the processor to transmit the electronic report to a plurality of different destinations over a computer network, the different destinations comprising: (i) a market reporting terminal, and (ii) an internal storage device.

12. The computer system of claim 8, wherein the aggregator module further includes instructions that when executed by at least the processor cause the processor to repeat the aggregation of the energy consumption data at a plurality of different times.

13. The computer system of claim 8, wherein the hierarchy module comprises instructions that, when executed by at least the processor, cause the computer to render the nodes graphically movable within the hierarchy in response to a drag and drop input operation as the graphical input instruction.

14. The computer system of claim 8, further comprising a rules engine stored on the memory and including instructions that when executed by at least the processor cause the processor to:
recognize, by at least the processor, a new characteristic of the energy supply network; and
in response to recognizing the new characteristic, initiate updating of the database to include the new characteristic for subsequent inclusion of the new characteristic in settlement points.

15. A computer-implemented method, the method comprising:
generating and displaying a hierarchy of nodes in a graphical representation of an energy supply network as a result of a graphical input instruction received by a computer, wherein nodes included in the hierarchy of nodes store energy consumption data, and are selectable to identify where aggregations of the energy consumption data are to be performed;

maintaining a database comprising characteristics of the energy consumption data for the nodes;

creating a settlement point to define an aggregation of the energy consumption data based on at least data from a plurality of nodes identified from the hierarchy, the nodes comprising a leaf node, wherein the created settlement point comprises: (i) one or more characteristics selected from the database, (ii) an algorithm defining the aggregation to be performed, and (iii) a record of each node included in a path between the leaf node and a root node corresponding to the leaf node, the record documenting the path in a canonical form;

receiving values for each of the desired characteristics included in the settlement point;

updating the record of each node included in the path as a result of a change made to the path through another graphic input instruction received by the computer to generate an updated record for the settlement point;

executing and controlling the aggregation of the energy consumption data according to the settlement point; and generating an electronic report comprising the aggregated energy consumption data.

16. The computer-implemented method of claim 15, further comprising:

predicting that a previous aggregation result for the settlement point during a previous usage period will change by at least a defined threshold based on the aggregation of the energy consumption data; and initiating a revision of the algorithm associated with the settlement point as a result of the prediction.

17. The computer-implemented method of claim 16 further comprising re-aggregating the energy consumption data during the previous usage period after the revision of the algorithm.

18. The computer-implemented method of claim 15 further comprising transmitting the electronic report to a plurality of different destinations over a computer network, the different destinations comprising: (i) a market reporting terminal, and (ii) an internal storage device.

19. The computer-implemented method of claim 15 further comprising repeating the aggregation of the energy consumption data at a plurality of different times.

20. The computer-implemented method of claim 15, further comprising rendering the nodes graphically movable within the hierarchy in response to a drag and drop input operation as the graphical input instruction.

* * * * *

UNITED STATES PATENT AND TRADEMARK OFFICE
CERTIFICATE OF CORRECTION

PATENT NO. : 10,534,798 B2  
APPLICATION NO. : 15/621030  
DATED : January 14, 2020  
INVENTOR(S) : Michel Page 1 of 1

It is certified that error appears in the above-identified patent and that said Letters Patent is hereby corrected as shown below:

On the Title Page

In Column 2, item (74) under Attorney, Agent, or Firm, Line 1, delete "Gruop," and insert -- Group, --, therefor.

In the Claims

In Column 18, Line 29, in Claim 10, delete "computer system" and insert -- computing system --, therefor.

In Column 18, Line 35, in Claim 11, delete "computer system" and insert -- computing system --, therefor.

In Column 18, Line 42, in Claim 12, delete "computer system" and insert -- computing system --, therefor.

In Column 18, Line 46, in Claim 13, delete "computer system" and insert -- computing system --, therefor.

In Column 18, Line 53, in Claim 14, delete "computer system" and insert -- computing system --, therefor.

Signed and Sealed this  
Sixth Day of April, 2021

Drew Hirshfeld  
*Performing the Functions and Duties of the  
Under Secretary of Commerce for Intellectual Property and  
Director of the United States Patent and Trademark Office*